United States Patent Office 3,573,128
Patented Mar. 30, 1971

3,573,128
METHOD AND APPARATUS FOR PRODUCING PRESSURE SENSITIVE TAPE
Charles P. Kettler, Akron, and John M. Questel, Stow, Ohio, assignors to Morgan Adhesives Company, Stow, Ohio
Filed Apr. 18, 1968, Ser. No. 722,437
Int. Cl. B32b 31/20; C09j 5/06
U.S. Cl. 156—283
10 Claims

ABSTRACT OF THE DISCLOSURE

A method and apparatus for making permanently tacky pressure sensitive tape including a heated, independently driven, main drum surrounded by adjustable planetary rolls which can be moved into and out of adjacency with the periphery of the heated drum. A first layer of release paper is adapted to be passed around the heated drum and beneath said planetary rolls and onto a take-up roll. A layer of open web paper is adapted to be passed beneath a power source and then about the periphery of the heated drum on top of the first layer of release paper. A second layer of release paper is adapted to be passed around the periphery of the heated drum on top of the open web paper after the depositing of the powder thereon, the heated drum and the planetary rolls being driven independently of each other and the planetary rolls serving to planish the laminate and prevent nip buildup.

BACKGROUND OF THE INVENTION

This invention in general relates to the art of making pressure sensitive adhesive tape for a variety of commercial, industrial and home uses. The finished product normally comprises a laminate of web paper impregnated with permanently tacky adhesive material and sandwiched between layers of easily removable release paper.

DESCRIPTION OF THE PRIOR ART

The following prior art is know to applicant: U.S. Pats. 1,619,027 McLaurin, 1,989,875 McLaurin, 2,355,919 Lipsius, 2,513,434 Tinsley, 2,872,365 DeBruyne et al., 2,890,147 Pearson et al., 3,218,185 Letteron.

While some of the above prior art references disclose the broad concept of dropping powdered material onto a web and then later heating it to impregnate the web, none of the references referred to disclose the novel method and apparatus for producing the laminate which will be described below.

SUMMARY OF THE INVENTION

It has been discovered that a new and improved method and apparatus for producing pressure sensitive tape can be achieved by providing a main independently driven heated drum. A three-piece laminate is passed about this drum with the laminate comprising a first sheet of release paper, a second sheet of open web paper upon which the adhesive material is deposited in powdered form before reaching the heated drum and a second sheet of release paper which is applied over the web paper. The laminate is passed about the periphery of the heated drum and a series of adjustable planetary rolls are provided to prevent a nip build-up and also to provide planishing.

The laminate, after passing about the heated drum, is either entirely wound on a take-up roll or the first sheet of release paper and the web paper are taken up on one roll while the second sheet of release paper may be taken up on still another roll.

The planetary rolls are normally independently driven and are adjustable relatively of the periphery of the main heated drum.

As a result of being heated while passing over the heated drum the adhesive material becomes permanently aggressively tacky thereby giving it the desired adhesion characteristics.

Accordingly, production of a method and apparatus having the above characteristics becomes the principal object of this invention with other objects thereof becoming more apparent upon a reading of the following brief specification considered and interpreted in view of the accompanying drawings.

Of the drawings:
FIG. 1 is a top plan view showing the improved apparatus for producing pressure sensitive tape.
FIG. 2 is a sectional view taken on the lines 2—2 of FIG. 1.
FIG. 3 is a side elevational partially schematic view of the improved machine.
FIG. 4 is a detailed view of the apparatus for unloading the machine.
FIG. 5 is a detailed view of the planetary rolls.

Considering first then the major components of the improved machine and referring particularly to FIG. 3, it will be noted that the machine, generally indicated by the numeral 10, includes a main frame 20 which is mounted on the floor and an auxiliary frame 30 preferably bolted or attached in a similar way to main frame 20. It should be noted that while a main and auxiliary frame are shown, the machine could have a unitary frame if desired.

The main frame 20 carries a freely journalled top release paper roll 40 while auxiliary frame 30 carries freely journalled open web paper roll 50 and bottom release paper roll 60. Additionally, the auxiliary frame 30 carries driven take-up rolls 70 and 80 as well as unloading mechanism 140.

In addition to the top release paper roll 40, the main frame 20 also has mounted thereon heated drum 90, powder dispenser 100 and planetary rolls 120, 120 together with their associated retractors 110, 110 and chain drive 130.

Considering first then the detailed construction of the main frame 20, it will be seen that the same includes a series of upright girders 21, 21 and top and bottom cross members 22 and 23 as well as cross members 24 and 25. These various frame members are secured together by welding or other suitable means so as to generally form an open cube-like framework.

The auxiliary frame 30 also includes upright girders 31, 31, bottom girders 32, 32 and inclined top girders 33, 33 and cross members 34 and 35 with these members also being fastened together by welding or other suitable means and preferably being secured to the main frame 20.

Only a brief description has been given with regard to frame members 20 and 30 since they do not really form a part of the invention and could be, in reality, of any desired construction so long as they are capable of supporting the various operational elements of the overall apparatus.

Turning next then to the heated drum 90, the same is carried by a support unit 91 and is secured to a power source 93 and driven by either a chain gear drive or a belt type drive, generally represented by the numeral 92 in FIG. 3. This drum 90, which is supported on arms 95, 95, is heated by any desired heating element, generally indicated by the numeral 94 in FIG. 2 and it should be noted that preferably the outside temperature of the drum is from 400 to 500° F. although it is to be understood that this temperature range can vary depending upon the particular adhesive material being utilized.

In addition to heated drum 90, the main frame also carries a series of planetary rolls 120, 120 which are piv- March 30, 1971 — A. E. ZEIS — 3,573,129
STATOR CORE ASSEMBLING APPARATUS
Filed Feb. 13, 1969 — 3 Sheets-Sheet 2

INVENTOR
ALBERT E. ZEIS
ATTORNEYS

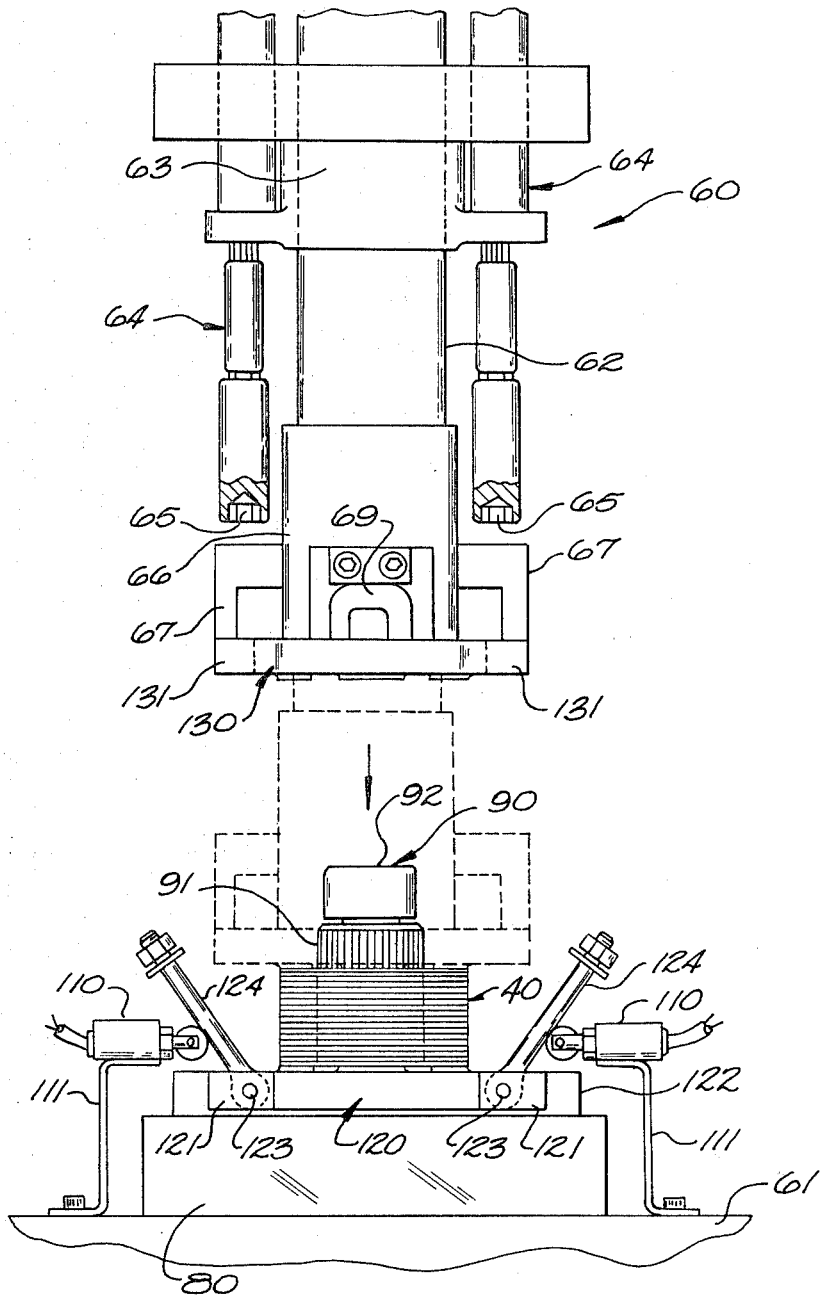
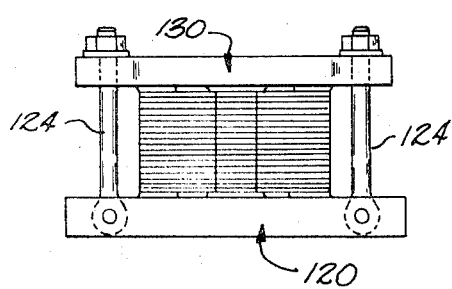
Fig 4
Fig 6
INVENTOR
ALBERT E. ZEIS
By
ATTORNEYS

United States Patent Office 3,573,129
Patented Mar. 30, 1971

3,573,129
STATOR CORE ASSEMBLING APPARATUS
Albert E. Zeis, St. Louis, Mo., assignor to Emerson
 Electric Co., St. Louis County, Mo.
Filed Feb. 13, 1969, Ser. No. 798,983
Int. Cl. B32b *31/20;* B65c *11/04*
U.S. Cl. 156—299
9 Claims

ABSTRACT OF THE DISCLOSURE

Liquid adhesive is applied to the outer surface of a stack of laminations on a mandrel, by means of pads soaked in adhesive. The adhesive is wicked radially from the pads between the facing surfaces of the laminations. Thereafter, the stack is clamped under predetermined axial pressure and the adhesive is cured. The pads are supplied with adhesive from reservoirs in arcuately winged pad mounts.

BACKGROUND OF THE INVENTION

It has been proposed frequently in the past to employ an adhesive as the sole bonding medium for cores of electric motors, and numerous methods of accomplishing this purpose have been used. Among the difficulties met with these methods, some of which are common to almost all methods of forming stator cores, are lack of rigidity, particularly after the motor is put into use, lack of squareness of the stator, the use of an excessive amount of material, and high tooling and maintenance costs.

The methods known heretofore have involved dipping cores which have previously been welded or strapped, dipping individual laminations or spraying them before they are stacked, or forcing adhesive under pressure through a clamped core.

One of the objects of this invention is to provide a process for making stator cores which is economical of labor and materials, requires little tooling maintenance, and produces a rigid and squarely stacked stator.

Other objects will become apparent to those skilled in the art in the light of the following description and accompanying drawing.

SUMMARY OF THE INVENTION

In accordance with this invention, generally stated, apparatus is provided by which and a method is provided in which a multiplicity of laminations is stacked to define an outer surface made up of outer edges of the laminations; adhesive soaked pads are pressed against the outer surface and adhesive from the pads is wicked into the spaces between successive laminations. The term "wick" refers to a capillary or surface action by which liquid is drawn into and along narrow spaces. In the preferred embodiment of method of this invention, the stacked laminations during the wicking step are subjected to an axial compression in an annular area which does not extend to the inner edges of the teeth of the laminations. After the wicking step, the stack is then clamped under a predetermined axial pressure which exceeds the compressive force applied during the wicking step, and while the stack is so clamped, the adhesive is cured to provide a bonded stator core.

Also, in the preferred embodiment, the laminations are stacked on a stacking mandrel during the wicking step, are thereafter removed from the stacking mandrel and placed on a squaring mandrel during the clamping step, are thereafter removed in their clamped condition from the squaring mandrel and are then cured.

The apparatus for applying the adhesive to the stack includes the stacking mandrel, a plurality of porous pads mounted for movement toward and away from the axis of the mandrel, and a liquid adhesive reservoir on the side of each pad opposite the side of the pad facing the mandrel, the containers having openings communicating with the pad whereby liquid adhesive in the containers is fed to the pads through the openings.

The apparatus for clamping the stack includes a squaring mandrel, upper and lower clamp rings, a press and automatic torque wrenches for providing the desired clamping pressure.

BRIEF DESCRIPTION OF THE DRAWING

In the drawing:

FIG. 1 is a fragmentary sectional view taken along the line 1—1 of FIG. 2 showing one embodiment of apparatus of this invention for applying adhesive and illustrating one step of the process of this invention;

FIG. 2 is a fragmentary sectional view taken along the line 2—2 of FIG. 1;

FIG. 4 is a fragmentary view in front elevation, partly broken away, showing apparatus for performing a subsequent step in the process of this invention, and illustrating the step;

FIG. 6 is a view in front elevation of a core clamped for curing.

DESCRIPTION OF THE PREFERRED EMBODIMENT

Figure 5:
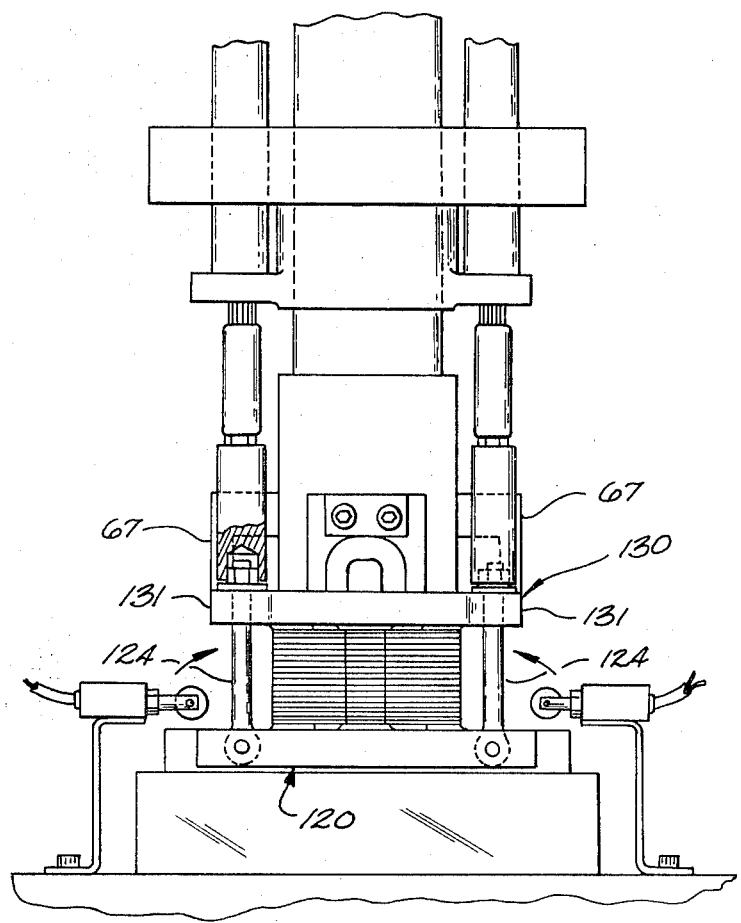
FIG. 5 is a fragmentary view in front elevation of the apparatus shown in FIG. 4, illustrating still a further step in the process of this invention.

Referring now to the drawing for one illustrative embodiment of apparatus and process of this invention, reference numeral 1 indicates apparatus by which the initial steps of the process are accomplished. The apparatus 1 includes a base plate 2, two posts 3 anchored in the base plate, and supporting between them a head beam 4, and an adhesive mechanism 20.

A hydraulic cylinder 5 is secured to the head beam 4, and is supplied with hydraulic fluid through flow control valves and tubing, one of which valves is shown. The cylinder 5 contains a piston, a rod 6 of which extends through a hole in the head beam 4, and is attached, at its lower end, to a cylindrical, open-bottomed ram 7.

A stacking mandrel 10 has a stepped base 11. During the steps illustrated in FIGS. 1–3, the mandrel 10 is axially aligned with respect to the ram 7 and square with adhesive mechanism 20. The base 11 rests on flanges 12 which define the mouth of an inverted T-shaped channel 13, into which a foot 14 of the mandrel 10 extends. The foot 14 is connected to a chain of a conveyor, of which the flanges 12 and the channel form a part.

Means for locating the mandrel 10 precisely with respect to the ram 7 and adhesive mechanism 20 are conventional, and are not here shown.

The adhesive mechanism 20 includes a pair of hydraulic cylinders 21 aligned diametrically with respect to the mandrel 10 on opposite sides of the mandrel, piston rods 22 and pad holders 23. The pad holders 23 are mounted on the facing ends of the piston rods 22, by means of a center boss 24 from which arcuate wings 25 extend. The wings 25 are of sufficient thickness to permit their being provided with reservoirs 26. Perforations 27 extend through the inner wall of the wings 25, communicating with the interior of the reservoir 26. Felt pads 30, covering the entire perforated area of the wings and extending beyond the perforated area both axially and circumferentially, are mounted on the inner faces of the wings 25. Reservoir supply fittings 32 communicate with the reservoirs, and, through flexible hoses 33, with a source of adhesive, not here shown.

Laminations in a stack of laminations 40 on the mandrel 10 are aligned so that teeth of the laminations define axially aligned slots, and the outer edges define the outer surface of what will become a stator core. Each stack 40 will constitute a single stator core. The stack fits closely but slidably on the mandrel 10.

Figure 3:
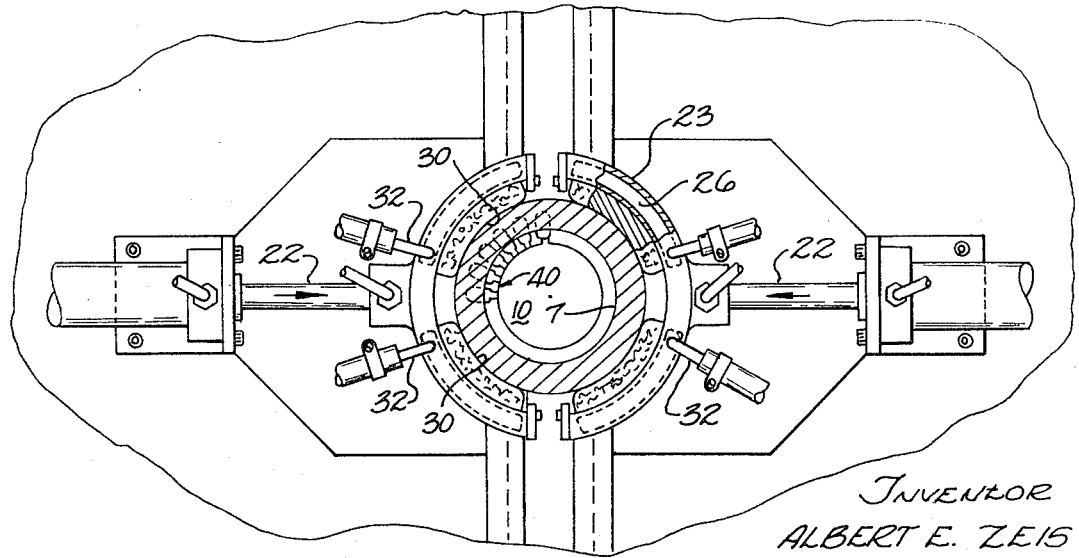
FIG. 3 is a fragmentary sectional view, partly broken away, in the same plane as the line 2—2 of FIG. 1, showing the apparatus of FIGS. 1 and 2 in position to accomplish an adhesive applying step in the process.

As shown particularly in FIGS. 2 and 3, the pad holders 23 move, from a position at which a stack mounted on the mandrel can move into position between them (FIG. 2), to a position at which the pads 30 are in snug engagement with the outside surface of the stack (FIG. 3). The ram 7 moves from a raised position, shown in FIG. 1, to a position in which the top of the mandrel 10 is within the open end of the ram and an annular planar bottom edge 8 of the ram engages the radial surface of the topmost lamination. The ram edge 8 engages the stack at an area radially outboard of the inner ends of the teeth, for example, half the total radial tooth length.

Referring to FIGS. 4 and 5, reference numeral 60 indicates one embodiment of clamping apparatus by which subsequent steps in the process of this invention can be performed. The apparatus 60 includes a heavy table 61 which supports four columns, not here shown, which, in turn, support a large hydraulic cylinder, also not here shown. A clamping ram 62 moves in and out of the cylinder.

A hydraulically operated sleeve 63, slidably mounted on the ram 62, carries on diametrically opposite sides of the ram 62 a pair of power-driven torque wrenches 64, which terminate in nut-receiving sockets 65. The ram 62 has at its lower end an annular pressure face in the form of a muff 66, with an open-ended cavity in it, and permanent magnets 69 and locating legs 67 mounted on the outside. Two magnets 69 are provided, mounted on diametrically opposite sides, and with flat faces of two poles of the U-shaped magnet flush with the bottom edge of muff 66. The locating legs 67 are chordally mounted, to the rear of the diameter in the plane parallel to the sheet as viewed in FIG. 4.

A squaring base 80 is mounted on the table 61. The squaring base 80 has a hole in it, through which a retractable, expanding, squaring mandrel 90 extends. The squaring mandrel 90 is concentric with the ram 62 and the muff 66, and is accurately perpendicular to upper and lower machined faces of the squaring base 80. The mandrel 90 has radially movable key carrying segments 91, normally biased radially inwardly, and arranged to be moved radially outwardly by a sleeve with an upper cap 92 which is engaged by a pneumatic plunger in the cavity in the muff 66 when the ram 62 is in its lowered position.

A pair of microswitches 110 at diametrically opposite sides with respect to the mandrel 90, are mounted on brackets 111 on the table 61.

As shown in FIGS. 4 and 5, a lower clamp ring 120 rests in a position accurately determined by locating blocks 122 on the machined face of the squaring base 80. The lower clamping ring 120 has a pair of ears 121 which carry pintles 123 upon which eyebolts 124 are hingedly mounted.

An upper clamp ring 130 has ears 131 defining a radially outwardly opening U-shaped channel within which the shanks of eyebolts 124 can be received, as shown particularly in FIG. 5.

In the illustrative embodiment shown, the core being made is to be used in a hermetic motor, and the underside of the upper clamp ring 130 has pads or bosses on it at the area of through bolt holes in the core, and the top side of the lower clamp ring 120 also has pads or bosses on it in positions corresponding to bearing surfaces of the base on which the stator will ultimately be mounted.

As shown in FIGS. 4 and 5, the upper clamp ring 130 is mounted on the bottom of the muff 66 by means of the magnets 69, and is located by the abutment of the ears 131 against an axial surface of the stop legs 67.

The upper and lower broad faces of the upper and lower clamp rings 130 and 120 respectively, and facing flat bearing surfaces of the bosses on both clamp rings are machined for accurate parallelism, and the bottom edge of the muff 66 is also machined for accurate parallelism with respect to the upper face of the squaring base 80.

A stack 40, removed from the stack mandrel 10, is mounted on the squaring mandrel 90.

In performing the steps of the method of this invention, individual laminations are stacked in substantially the orientation in which they are to be in a finished stator core, and are mounted on the mandrel 10. In the embodiment shown, the mandrel 10 has a spline on it, but the base 11 can have a locating post, extending into a gap between successive teeth defining a slot, or the laminations may be held against shifting in any desired way. In any case, they are not welded or strapped together. The mounting of the stack 40 on the mandrel 10 can be done at any station along the conveyor before the mandrel 10 reaches the apparatus 1, or it can be mounted when the mandrel has reached the position shown in FIG. 2. In any event, when the mandrel 10 is at the station shown in FIG. 2, it is located and held in position by conventional means.

To facilitate the subsequent wicking step, it may be desirable to create a temperature differential between the stack and the liquid adhesive. The adhesive may be warmed more than the stack or vice versa; for example, the adhesive may be at room temperature, around 80° F., and the stack warmed, for example to between 200° and 400° F.

The ram 7 is lowered over the mandrel 10 and onto the stack 40 with a predetermined load the optimum value of which will vary with the height of the stack, the type of laminations and the character of the adhesive which is to be applied. With a common epoxy-type varnish, of a syrupy consistency, a three inch stack and an approximately five inch diameter core, a pressure of thirty to forty pounds total has been found satisfactory. If excessive pressure is used, too little varnish is wicked, which leads to bleeding during subsequent processing. However, satisfactory pressures for any particular set of conditions can readily be ascertained when the process is performed.

The reservoirs 26 are filled with adhesive from a large tank, not here shown, through metering lines, and the felt pads 30 are saturated with the adhesive. Hydraulic fluid is fed to the cylinders 21 to move the rods 22, hence the pads 30, to the position shown in FIG. 3. The wicking action of the laminations is rapid and highly effective. The fact that the ram edge 8 does not engage the inner ends of the teeth serves to permit the wicking to stop short of the bore of the stator 40 because of the natural flair of the teeth.

The optimum time required for the wicking process, the quantity of adhesive carried by the pads and the feed rate of the adhesive from the reservoirs to the pads will again vary with the character of the laminations and the viscosity of the adhesive.

When the wicking step is complete, the pads are with-drawn to the position shown in FIG. 2, the ram is raised, the conveyor is started, and the wicked core is moved toward its next station. The wicking of the core is so effective that the varnish does not flow either along the outside axially extending surface of the stack or any of its inside axially extending surfaces.

A lower clamp ring 120 is positioned on the machined face of the squaring base 80, and the clamping mandrel 90 is raised. The stack is next removed from the stacking mandrel and placed on the squaring mandrel 90, resting on the pads of the lower clamping ring. The orientation of the stack 40 with respect to the pads of the lower clamping ring is ensured by any conventional means, such as a locating lug on the lower clamping ring and complementary locating notch in the lamination. The eyebolts 124 are in the position shown in FIG. 4, actuating the microswitches 110. If the microswitches 110 are not actuated, the clamping apparatus will not lower.

An upper clamp ring 130 is mounted on the muff 66, and the ram 62 is lowered to the position shown in the dotted lines in FIG. 4. A boss within the muff 66, impinging upon a plunger in the mandrel 90, causes the segments 91 to move radially outwardly, exactly to align the laminations and ensuring that the stack and its bore are square when the clamp is assembled. The clamp ring 130 is forced down upon the stack 40 with a pressure commensurate with the pressure to which the core will ultimately be subjected when the core is mounted on a base in a hermetic motor, in this illustrative embodiment, as has been explained heretofore. This pressure is greater by a considerable order of magnitude than the pressure exerted by the ram during the wicking process. As a result, the varnish is driven farther toward the inner ends of the teeth, the throughbolt areas lying near the outer periphery of the yoke sections of the laminations. If the amount of adhesive wicked into the stack is properly regulated, however, no bleeding of the varnish is caused, or at least not enough to produce running of the varnish down the axial surfaces of the stack.

The eyebolts 124 are then moved to the position shown in FIG. 5, the torque wrenches 64 are lowered until nuts on the eyebolts are seated in the sockets 65, and the torque wrenches 64 are rotated to tighten the nuts to the desired tightness. The wrenches are again raised, and the ram 62 retracted. The weight of the stator and both clamp rings is more than the magnets 69 can raise, and the clamps assembly remains on the base 80.

The mandrel 90, the segments of which have retracted in response to the release of the actuating plunger, is dropped, and the clamped stack is put into a curing oven to permit the varnish to cure. The stack, now a stator core, is removed from between the clamping rings and wound to form a stator.

Having thus described the invention, what is claimed and desired to be secured by Letters Patent is:

1. The process of producing a stator core comprising stacking a multiplicity of laminations each having inwardly radially extending teeth and a yoke section radially outboard of said teeth, edges of said teeth and said yoke section defining inner and outer surfaces, respectively, of the stack formed by said laminations; applying to the stack of laminations a predetermined axial compressive force; thereafter, while maintaining said axial compressive force, applying a liquid adhesive to the axially extending outer surface only of the stack and wicking said adhesive radially between the facing surfaces of the said laminations; thereafter squaring said stack and clamping the square stack under predetermined axial pressure, and thereafter curing the said adhesive.

2. The process of producing a stator core comprising stacking a multiplicity of laminations having a yoke section and radially inwardly extending teeth to form a stack having an outer surface defined by outer edges of said laminations, supplying liquid adhesive to said outer surface and permitting the adhesive to wick into the interstices between the laminations while maintaining the stack under compressive force of a magnitude to permit wicking of sufficient adhesive but not an excess thereof, clamping the stack and, while said stack is clamped, curing the adhesive, said compressive force applied during the wicking step and said clamping force applied during the curing step being applied directly to an area radially outboard of the radially inner ends of the teeth.

3. A machine for applying liquid adhesive to a stack of laminations, comprising a stacking mandrel adapted to receive a multiplicity of laminations, said mandrel having a long axis; a ram mounted for movement axially toward and away from said mandrel and being adapted to embrace said mandrel circumferentially and to engage and compress laminations stacked on said mandrel; a plurality of porous pads mounted for movement toward and away from the axis of said mandrel and a liquid adhesive container on the side of said pads opposite the side of the pads facing the mandrel, said container having openings communicating with the said pads whereby liquid adhesive in said containers is fed to said pads through said openings.

4. The process of producing a stator core comprising stacking a multiplicity of lamination each having inwardly radially extending teeth and a yoke section radially outboard of said teeth, edges of said teeth and said yoke section defining inner and outer surfaces, respectively, of the stack formed by said laminations; thereafter compressing said stack of laminations axially in an annular area which does not extend to the inner edge of the teeth, and, while maintaining said axial compression, applying a liquid adhesive to the axially extending outer surface only of the stack and wicking said adhesive radially between the facing surfaces of the said laminations; thereafter clamping the stack under predetermined axial pressure, and thereafter curing the said adhesive.

5. The process of claim 4 wherein the compressive force is released after the liquid adhesive is applied and wicked, and thereafter an axially directed clamping compressive force is applied which is greater than the compressive force exerted on the stack during the liquid adhesive application.

6. The process of producing a stator core comprising stacking on a stacking mandrel a multiplicity of laminations each having inwardly radially extending teeth and a yoke section radially outboard of said teeth, edges of said teeth and said yoke section defining inner and outer surfaces, respectively, of the stack formed by said laminations; thereafter while said stack is on said stacking mandrel, applying a liquid adhesive to the axially extending outer surface only of the stack and wicking said adhesive radially between the facing surfaces of the said laminations; removing said stack from said stacking mandrel and placing it on a squaring mandrel; thereafter, while the stack is on the squaring mandrel, clamping the stack under predetermined axial pressure; thereafter removing the clamped stack from the squaring mandrel, and thereafter curing the said adhesive.

7. The process of producing a stator core comprising stacking a multiplicity of laminations to form a stack having an outer surface defined by outer edges of said laminations, supplying liquid adhesive to said outer surface and permitting the adhesive to wick into the interstices between the laminations while maintaining the stack under compressive force of a magnitude to permit wicking of sufficient adhesive but not an excess thereof, clamping the stack axially and, while said stack is clamped, curing the adhesive, said clamping force exceeding the compressive force applied during the wicking step.

8. The process of producing a stator core comprising stacking a multiplicity of laminations to form a stack having an outer surface defined by outer edges of said laminations, heating one of the said stack and a liquid adhesive to produce a temperature differential between them; thereafter supplying said liquid adhesive to said outer surface, while maintaining said temperature differential, and permitting the adhesive to wick into the interstices between the laminations while maintaining the stack under compressive force of a magnitude to permit wicking of sufficient adhesive but not an excess thereof, clamping the stack and, while said stack is clamped, curing and adhesive.

9. The process of claim 8 wherein the stack is heated to a temperature in the range of 200° to 400° F.

References Cited

UNITED STATES PATENTS

| | | | |
|---|---|---|---|
| 2,089,422 | 8/1937 | Powell | 156—563 |
| 3,356,360 | 12/1967 | Ward | 156—563X |

SAMUEL W. ENGLE, Primary Examiner

J. M. HANLEY, Assistant Examiner

U.S. Cl. X.R.

156—312, 563, 578